(12) United States Patent
Acker et al.

(10) Patent No.: US 6,794,067 B1
(45) Date of Patent: Sep. 21, 2004

(54) FUEL CELL CONTROL AND MEASUREMENT APPARATUS AND METHOD, USING DIELECTRIC CONSTANT MEASUREMENTS

(75) Inventors: William P. Acker, Rexford, NY (US); Michael S. Adler, Niskayuna, NY (US)

(73) Assignee: MTI MicroFuel Cells, Inc., Albany, NY (US)

( * ) Notice: Subject to any disclaimer, the term of this patent is extended or adjusted under 35 U.S.C. 154(b) by 236 days.

(21) Appl. No.: 09/725,728

(22) Filed: Nov. 29, 2000

(51) Int. Cl.[7] .................................................. H01M 8/04
(52) U.S. Cl. ........................................... 429/13; 429/22
(58) Field of Search .............................. 429/13, 17, 19, 429/22

(56) References Cited

U.S. PATENT DOCUMENTS

| | | | |
|---|---|---|---|
| 4,189,725 A | 2/1980 | Rowland | |
| 4,438,182 A | 3/1984 | Papazian | |
| 4,810,597 A | * 3/1989 | Kumagai et al. | ............. 429/22 |
| 4,876,513 A | 10/1989 | Brilmyer et al. | |
| 5,126,729 A | * 6/1992 | McKinney et al. | ......... 340/450 |
| 5,366,820 A | * 11/1994 | Tsutsumi et al. | ............. 429/19 |
| 5,381,096 A | 1/1995 | Hirzel | |
| 5,396,177 A | 3/1995 | Kuo et al. | |
| 5,414,368 A | 5/1995 | Ogawa et al. | |
| 5,455,499 A | 10/1995 | Uskali et al. | |
| 5,563,004 A | 10/1996 | Buzzelli et al. | |
| 5,592,095 A | 1/1997 | Meadows | |
| 5,600,230 A | 2/1997 | Dunstan | |
| 5,606,242 A | 2/1997 | Hull et al. | |
| 5,648,717 A | 7/1997 | Uskali | |
| 5,703,469 A | 12/1997 | Kinoshita | |
| 5,761,072 A | 6/1998 | Bardsley, Jr. et al. | |
| 5,789,100 A | 8/1998 | Burroughs et al. | |
| 6,037,777 A | 3/2000 | Champlin | |
| 6,114,838 A | 9/2000 | Brink et al. | |
| 6,383,670 B1 | * 5/2002 | Edlund et al. | ............... 422/108 |

FOREIGN PATENT DOCUMENTS

| | | | |
|---|---|---|---|
| JP | 2-125560 | * | 5/1990 |
| JP | 9-24999 | * | 1/1997 |
| WO | WO 01/13451 | * | 2/2001 |
| WO | WO 01/23876 | * | 4/2001 |

* cited by examiner

*Primary Examiner*—Randy Gulakowski
*Assistant Examiner*—Jonathan Crepeau
(74) *Attorney, Agent, or Firm*—Jay R. Yablon

(57) ABSTRACT

For a direct oxidation fuel cell system in which the source fuel is diluted with a diluting fluid prior to entering the fuel cell generally, and for a Direct Methanol Fuel Cell System (DMFC) in which the methanol source fuel is diluted with water, the dielectric constant of the fuel mix comprising the source fuel and the diluting fluid is measured to determine the relative proportions of source fuel and diluting fluid within this fuel mix. This measurement may then be used in a feedback loop to control the subsequent mixing of the source fuel with the diluting fluid, and in particular, to adjust the mix in the event the fuel mix is too rich or too dilute as compared to a desired mixing proportion. Additionally, a second dielectric constant measurement is used to determine the source fuel level of a fuel tank providing source fuel to the fuel cell. Finally, an optional telecommunications link is used to automatically order a source fuel refill when the source fuel runs low.

44 Claims, 2 Drawing Sheets

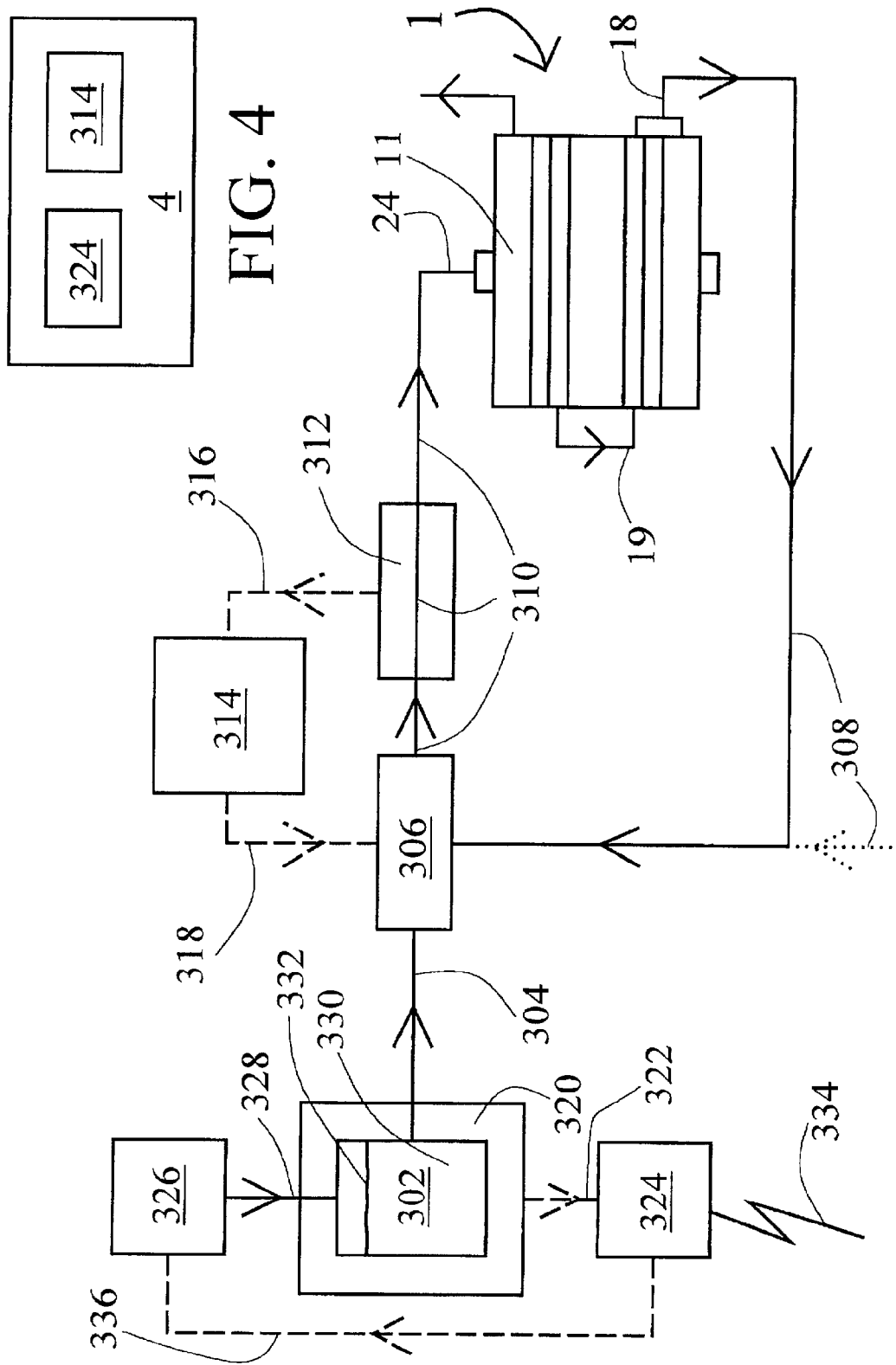

FUEL CELL CONTROL AND MEASUREMENT APPARATUS AND METHOD, USING DIELECTRIC CONSTANT MEASUREMENTS

FIELD OF THE INVENTION

This invention relates generally to fuel cells, and specifically, to using measurements of the dielectric constant to control and measure critical operations of the fuel cell.

BACKGROUND OF THE INVENTION

Fuel cells are becoming more widely used as an inexpensive, continuous source of energy for many different applications. Direct Methanol Fuel Cell Systems (DMFCs), in particular, have the potential to provide power for electronics at a significantly higher energy density than batteries, in a scalable, small system.

FIGS. 1 and 2 illustrate two variations of a basic fuel cell 1, well known in the art, which in this illustration, could be either a reformer based fuel cell as in FIG. 1, or a direct oxidation fuel cell as in FIG. 2. Whether reformer-based or direct oxidation, a fuel cell 1 comprises an anode chamber 11, an anode electrode 12, an electrolyte 13, a cathode electrode 14, and a cathode chamber 15. The two electrodes, namely anode electrode 12 and cathode electrode 14 are sandwiched around electrolyte 13 as shown.

In reformer-based fuel cells, hydrogen 16, extracted from a hydrocarbon source fuel such as, but not limited to, natural gas, methanol, ethanol, butane, propane, or even gasoline, is fed into anode chamber 11, while oxygen, or a gas comprising oxygen 17, such as air, is fed (or allowed to enter) to cathode chamber 15. Anode electrode 12 contains a catalyst that promotes the chemical reaction that causes hydrogen atoms from a source fuel to split into protons and electrons. The protons pass through electrolyte 13, but the electrons, which are unable to pass through electrolyte 13, must instead take a different path around electrolyte 13. This creates a current 19 which is utilized to provide power, before the electrons return to cathode electrode 14. With the aid of cathode electrode 14, the hydrogen protons and oxygen are reunited on the cathode side of the fuel cell to create the fuel cell waste product, namely, water 18. Because fuel cell 1 relies on electrochemical oxidation and not combustion, emissions are not nearly as significant as emissions from even the cleanest fuel combustion processes.

In a reformer-based fuel cell system such as is illustrated in FIG. 1, hydrocarbons with multiple carbon atoms can be used as fuel. These fuels generally have higher energy density than fuels used in direct oxidation systems, but must be reformed by a separate fuel reformer 10, to assist in extracting hydrogen from the source fuel. Reformation is a technically difficult process that consumes energy and increases complexity of the overall fuel cell system. Because direct oxidation fuel cell systems generally use fuels that are molecularly simple, no reformer is needed to promote the reaction that releases the protons and electrons to generate electricity. As such, direct oxidation systems are simpler and can be fabricated in a smaller volume.

FIG. 2 illustrates a Direct Oxidation Fuel Cell, as would be present in a DMFC. Other than the absence of a fuel reformer 10, schematically, a Direct Oxidation Fuel Cell is identical to a Reformer Based Fuel such as was illustrated in FIG. 1, though it may be made from different materials to account for the different electrochemistry of the direct oxidation source fuels (including methanol), as opposed to a reformed source fuel. A Direct Oxidation Fuel Cell generates current in a fashion similar to reformer-based fuel cell systems, wherein anode electrode 12 promotes the desired oxidation of the fuel (methanol) and electrons flow, supporting a load. However, because the source fuel for a direct oxidation fuel cell is generally in a different phase than a reformed fuel, and because there are different by-products of the electricity-producing reaction, direct oxidation fuel cells have different ancillary support systems than reformer-based fuel cells.

In a DMFC, a liquid methanol ($CH_3OH$) and water ($H_2O$) mix 24 enters fuel cell 1 directly at anode chamber 11, as opposed to a reformer-based fuel cell wherein a reformed fuel containing hydrogen 16 ($H_2$) extracted with the aid of the reformer 10 enters anode chamber 11. At anode electrode 12, methanol is oxidized according to:

$$CH_3OH + H_2O \rightarrow CO_2 + 6H^+ + 6e. \quad (1)$$

The $CO_2$ 23, is discharged as a waste product from anode chamber 11. The hydrogen ions ($H^+$) pass through the membrane electrolyte 13, which may comprise, for example, Nafion®, a commercially available material. Electrons (e) do not pass through the membrane electrolyte, and must take a different path through the load, creating a usable current 19. At cathode electrode 14, the oxygen 17 ($O_2$) reunites with the electrons (e) from current 19 and the hydrogen ions ($H^+$) according to:

$$O_2 + 4e + 4H^+ \rightarrow 2H_2O, \quad (2)$$

thus creating water 18 ($H_2O$) as a waste product. The overall chemical reaction of the DMFC 1 is therefore given by:

$$CH_3OH + 3/2 O_2 + 2H_2O. \quad (3)$$

DMFC 1 also comprises an anode gas diffusion layer (GDL) 21, and a cathode gas diffusion layer 22, which are utilized to ensure that the fluids involved in these reactions are diffused in a substantially uniform manner over anode chamber 11 and cathode chamber 15 respectively. The gas diffusion layers 21 and 22 are also typically part of a reformer-based system such as illustrated by FIG. 1, but are omitted from FIG. 1 for simplicity of illustration.

As noted in the earlier discussion and specified in eq. 1, pure methanol is not fed to anode chamber 11. Rather, to operate fuel cell 1 at peak efficiency, it is preferred to feed to anode chamber 11 a dilute mixture of methanol and water. In particular, it is well known in the art that the membrane electrolyte 13 is, to varying degrees permeable to water, methanol, and protons. As such, if the methanol concentration is too high relative to the water on the anode side of the DMFC, some methanol will pass through electrolyte 13 and react with the source of oxygen or air 17 without contributing to current 19. This reduces the efficiency of the DMFC, and wastes methanol. Alternatively, if not enough methanol is supplied, fuel cell 1 will not receive enough fuel to generate the desired current 19.

A 3% methanol, 97% water mixture is typical using current technology and load requirements. However, it is anticipated that over the longer term, this concentration might be as low as 2% or even 1%, but may become substantially higher as advances in the fuel cell 1, the electrolyte 13, and the ancillary systems are realized. As such, variations in methanol concentration are to be considered within the scope of this disclosure and its associated claims, and these may run as high as 5%, 10%, 15%, 30%, 50%, 75%, 90%, and even 100% as the fuel cell 1 and fuel cell system technology progresses.

More generally, the exact fuel and water mixing proportion in any given fuel cell application is related to the particular technology of fuel cell 1 and the overall fuel cell system which comprises fuel cell 1, and it is expected that these technologies will improve over time. Thus the desired mixing proportions will change as well. This anticipated change in optimum mixing proportions as these technologies progress is considered to be within the scope of this disclosure and its associated claims.

The water 18 produced as a by-product of DMFC operation is suitable as a water supply for mixing with the methanol source fuel, and indeed, is an attractive source for diluting water. In particular, provided that suitable methods for managing water are implemented, a DMFC system may be self-contained because the cathode-side fuel cell 1 reaction produces adequate water to operate the DMFC. It may, however, be necessary to remove some water from the DMFC to prevent saturation of the cathode electrode 14 of fuel cell 1. To ensure a proper mix of methanol and water, it is necessary to measure the relative concentration of methanol and water being supplied to anode chamber 11 on either a continuous or periodic basis. Further, it is necessary to utilize the measurements of the methanol and water mix as a basis for controlling the methanol and water concentration, in a feedback loop process.

Additionally, a fuel cell system often comprises a fuel tank (302 in FIG. 3) which stores the hydrocarbon source fuel such as methanol, whether in a pure form or pre-diluted with water. Of course, when the fuel is entirely consumed, no fuel will be delivered to the fuel cell, and the DMFC will no longer operate. As such it is desirable to measure the source fuel remaining in fuel tank 302, again on at least a periodic basis, so that additional source fuel can be supplied as needed.

While batteries and fuel cells each produce electricity through electrochemical reactions, there are fundamental differences that distinguish them from one another.

A battery is essentially a closed system whose effective cycle is limited, in part, by the amount the reactants that can be held within such system at any time. A battery generates electricity via a chemical reaction at the anode and the cathode with the electrolyte serving as the media for the transport of the reactants, creating a current that can be used to support an electric load. During this reaction, a battery's anode, cathode, and electrolyte are reacted and consumed causing the battery to lose its ability to generate a current. A battery can be discharged only once before it must be replaced, or recharged by reversing the electrochemical reaction that causes the battery to discharge its energy. This reaction is generally reversed by passing a current through the battery, which also reverses the reaction that has consumed the electrodes and electrolyte. It is impossible to increase either the discharge time or maximum output of a particular battery without increasing the size of the battery proportionally.

Like a battery, a fuel cell generates an electrical current through a chemical reaction. However, unlike a battery, the electrodes and electrolyte in a fuel cell are not degraded or significantly altered by the reaction that generates electric current, making it possible to generate electricity for as long as source fuel is supplied to the fuel cell system. Because a fuel cell does not have to be a closed system, it is possible to add source fuel either periodically or continuously, allowing the system to generate electricity without interruption. In addition, the overall energy output of a fuel cell is related to the amount of source fuel supplied (which can be increased with time), rather than the size of the battery, making it possible for comparatively small fuel cells to deliver, over time, the same amount, or more energy, than a large battery.

It is, of course, well known that capacitive measurement of dielectric constants can be used to determine certain characteristics of substances for which this dielectric constant is measured. U.S. Pat. No. 4,438,182, for example, discloses a method for determining the life of a battery, by measuring the dielectric constant of the battery electrolyte over time. However, among other differences, this patent is entirely concerned with measuring the changes in the dielectric properties of a battery electrolyte to infer a state of charge, whereas in a direct methanol fuel cell, the characteristics of the membrane electrolyte do not change significantly, and are not measured. Rather, for a DMFC system, the concern is with directly measuring fuel concentration, and source fuel level, which are unrelated to the state of the electrolyte.

In addition, a battery has fixed amounts of reactants, which are not "consumed" like a liquid fuel. Rather they react with one another and are chemically changed, and the volume of a battery's reactants, in aggregate, remains constant as electricity is provided. Because of its construction, and the physical characteristics of its reactants, a battery typically can be oriented in any direction, without adverse impact on measurements that might be taken of the reactants. However, in a DMFC, as fuel is consumed, a fuel cell tank will comprise an ever-changing mix of air and hydrocarbon source fuel, such as methanol. If the Direct Oxidation Fuel Cell system, such as a DMFC, or indeed any fuel cell system, is reoriented, for example, turned on its side or upside down, methods of measuring the level of a source fuel that depend on a fixed or constant orientation will be inaccurate. It is therefor desirable to find an orientation-independent method to measure the source fuel level.

OBJECTS OF THE INVENTION

It is therefore desirable to provide a simple, low-cost apparatus and method to measure the relative quantities of water and methanol being mixed together and supplied to the anode of a DMFC, in order to optimize the efficient consumption of methanol source fuel by the DMFC.

It is further desirable to utilize these measurements of the relative quantities of water and methanol to control the subsequent mixing of water and methanol, in a feedback loop process.

It is further desirable to provide a simple, low-cost apparatus and method to monitor the source fuel remaining in the fuel tank of a DMFC.

It is further desirable for this apparatus and method to monitor the source fuel remaining in the fuel tank of a DMFC to do so in a way that is independent of the orientation of the fuel cell.

It is further desirable for control and logic components in the DMFC to act upon data related to the amount of fuel that remains, and to automatically order additional fuel via a telecommunications link when the fuel level falls below a predetermined point.

SUMMARY OF THE INVENTION

For a direct oxidation fuel cell system in which the source fuel is diluted with a diluting fluid prior to entering the fuel cell generally, and for a Direct Methanol Fuel Cell System (DMFC) in which the methanol source fuel is diluted with water, the dielectric constant of the fuel mix comprising the source fuel and the diluting fluid is measured to determine the relative proportions of source fuel and diluting fluid within this fuel mix. This measurement may then be used in a feedback loop to control the subsequent mixing of the source fuel with the diluting fluid, and in particular, to adjust the mix in the event the fuel mix is too rich or too dilute as compared to a desired mixing proportion. Additionally, a second dielectric constant measurement is used to determine the source fuel level of a fuel tank providing source fuel to the fuel cell.

In a preferred embodiment, a fuel cell system comprises a fuel cell mixing apparatus such as a chamber into which can be fed a source fuel and a diluting fluid, capable of mixing the source fuel and the diluting fluid together in a desired mixing proportion into a fuel mix, and capable of outputting the fuel mix for feeding to a fuel cell. This system further comprises a fuel mix dielectric constant sensor capable of measuring a fuel mix dielectric constant of the fuel mix output from the fuel cell mixing apparatus, thereby enabling the relative proportions of the source fuel and the diluting fluid within the fuel mix to be determined from the fuel mix dielectric constant. The measurement of the fuel mix dielectric constant is then used in a feedback loop as a basis to adjust, as needed, the mixing the source fuel and the diluting fluid together, in order to maintain the desired mixing proportion.

BRIEF DESCRIPTION OF THE DRAWING

The novel features of the invention are set forth in the appended claims. The invention, however, together with further objects and advantages thereof, may best be understood by reference to the following description taken in conjunction with the accompanying drawing(s) in which:

FIG. 3 is a block diagram illustrating a first preferred embodiment of a Direct Oxidation Fuel Cell system according to this disclosure.

FIG. 4 illustrates the combination of the fuel mix control and indicator module and fuel tank control and logic module of FIG. 3 into a single dielectric constant measurement control and logic module.

DETAILED DESCRIPTION OF THE INVENTION

Figure 1:
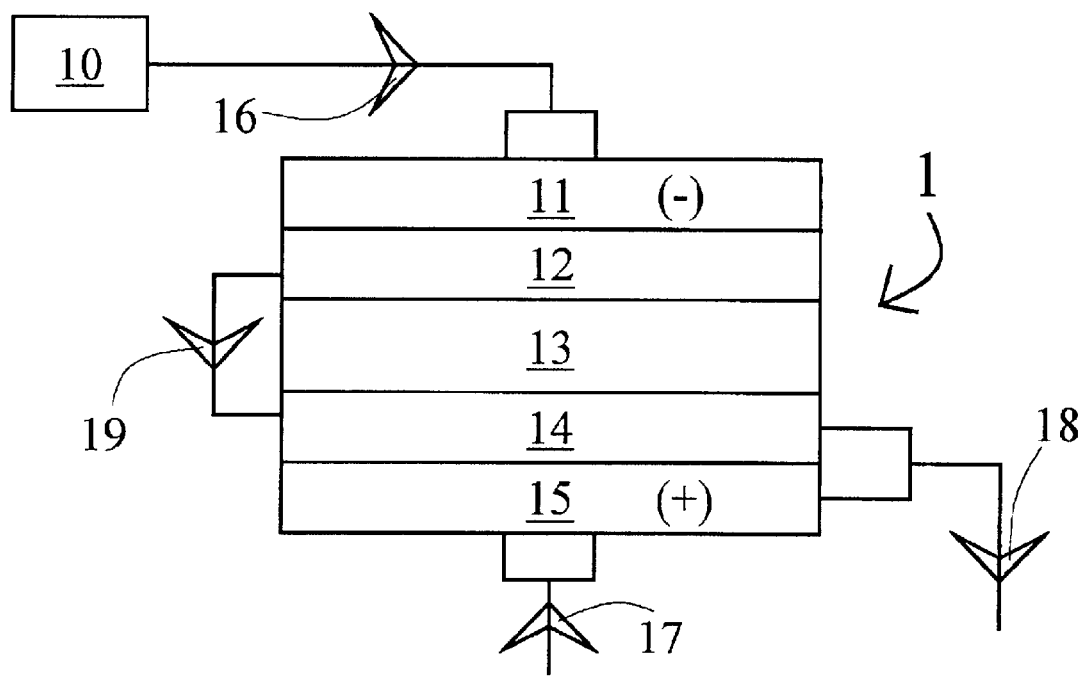
FIG. 1 is a schematic illustration of a typical reformer based fuel cell, according to the prior art.

At the outset, it is necessary to distinguish two different uses of the term "fuel" as used in this disclosure and its associated claims. As noted above, in particular applications, fuel cells utilize a hydrocarbon source fuel such as, but not limited to, natural gas, methanol, propane, or even gasoline, as the basis for generating usable energy. For a DMFC, this hydrocarbon source fuel is methanol. As used in this disclosure, the term "source fuel" is thus intended to refer generally to whatever hydrocarbon fuel is used as the basis for generating electricity, either in pure form, or in some cases, premixed with a diluting fluid such as water. And, in terms of FIG. 3, the "source fuel" is intended to refer to whatever fuel/diluting fluid mix is stored in fuel tank 302. For a DMFC, this source fuel 330, of course, is methanol, either pure, or already diluted with water.

As noted earlier, a mixture of methanol and water is currently required to operate fuel cell 1 at peak efficiency. In general, this is a diluted mixture comprising approximately 3% methanol (the source fuel) and 97% water, with acceptable variations in methanol concentration ranging from as low as 1% to as high as 100%. As discussed above, the exact fuel and water mixing proportion in any given fuel cell application is related to the particular technology of fuel cell 1 and the overall fuel cell system which comprises fuel cell 1, and it is expected within the scope of this disclosure and its associated claims that these technologies will improve over time. Thus the desired mixing proportions will change as well. There may also be other fuel cells now or in the future involving non-methanol source fuels where it is similarly desirable to mix the source fuel 330 with water or some other diluting fluid, in some desired mixing proportion, prior to feeding that mixture to fuel cell anode chamber 11. Thus, the term "fuel mix" will be utilized in this disclosure to refer generally to any mixture of a source fuel such as methanol, with a diluting fluid such as, but not limited to, water, that is fed to the anode of fuel cell 1. For the specific case of a DMFC, the term "fuel mix" is presently intended to refer to this mixture of approximately 3% methanol with 97% water or a similar diluting fluid, again, subject to the methanol percentage variations and anticipated technology changes discussed earlier. More generally, the term "fuel mix" refers to whatever mix of source fuel and diluting fluid is fed to the anode in any and all direct oxidation fuel cell systems, i.e., in any fuel cell system in which the source fuel is not reformed 10 so as to separate hydrogen 16 from the source fuel prior to its reaching anode chamber 11.

Thus, with respect to FIG. 3, the source fuel 330 is whatever fluids reside in fuel tank 302, and the fuel mix 24 is whatever fluids are fed into the fuel cell anode chamber 11.

Figure 2:
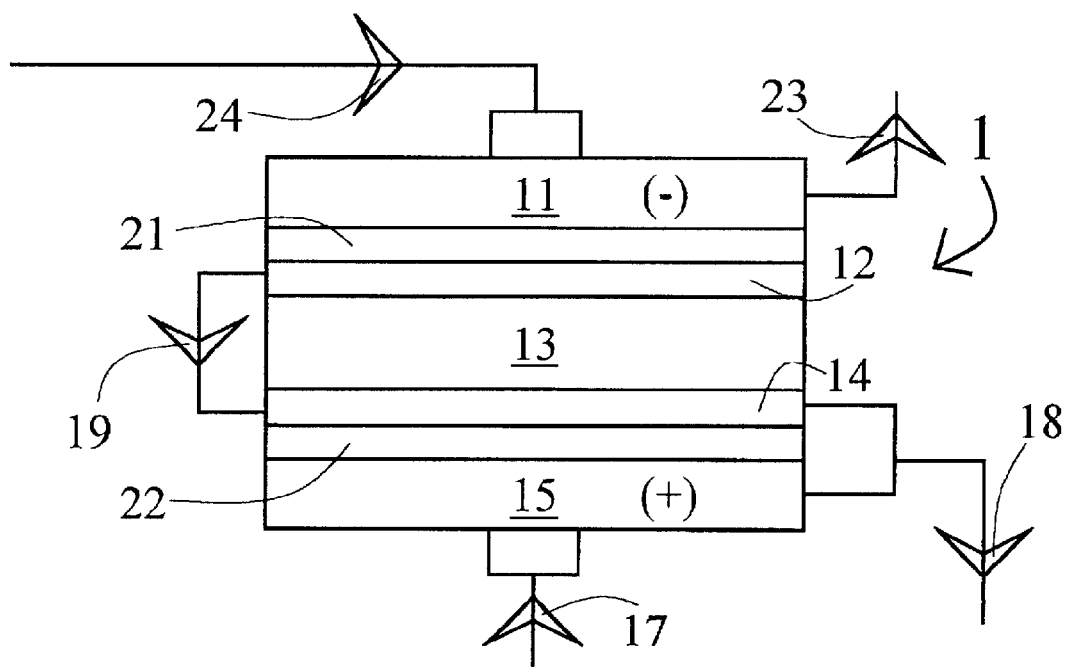
FIG. 2 is a schematic illustration similar to FIG. 1, of a direct methanol fuel cell (DMFC), which directly electrochemically oxidizes methanol at the anode and eliminates the need for a fuel reformer to extract hydrogen from the source fuel.

Finally, it is to be observed that the use of the term "fuel cell" herein is generally meant to refer more narrowly to the fuel cell 1 that produces current 19 through the various reactions and processes noted in the earlier discussion of FIGS. 1 and 2. The term "fuel cell system" is meant to refer more broadly to the overall combination of supporting structures such as fuel tanks, mixing apparatuses, detectors, control modules, etc., that may be combined with a fuel cell 1 into an overall operational system, such as is illustrated by FIGS. 3 and 4.

With the desired interpretation of the terms "source fuel" and "fuel mix" thus established, FIG. 3 is a block diagram illustrating a first preferred embodiment of the invention, and applies generally to direct oxidation fuel cells where it is desirable to mix a source fuel such as methanol with a diluting fluid such as water prior to delivering this fuel mix 24 to anode chamber 11. For a direct oxidation fuel cell system generally, a fuel tank 302 stores the source fuel 330, and for a DMFC specifically, fuel tank 302 stores the methanol source fuel 330. For a DMFC, this methanol source fuel 330 may be pure, undiluted methanol, or, for example, methanol that is already pre-mixed with water, for example, not limitation, in an approximately 50% methanol and 50% water concentration. This source fuel 330 is fed via a source fuel conduit 304 into a fuel mixing apparatus 306, such as a mixing chamber. Additionally, water waste 18 from the cathode chamber 15 of fuel cell 1 is fed via a diluting fluid conduit 308 into fuel mixing apparatus 306. Thus, it will be the general function of fuel mixing apparatus 306 to mix source fuel 330 with the diluting fluid in a desired mixing proportion, and to output a suitable fuel mix 24. For a DMFC specifically, fuel mixing apparatus 306 thus functions to mix the methanol source fuel 330 with the water waste 18 from cathode chamber 15 of the fuel cell 1 and to output a fuel mix 24 comprising approximately 3% methanol and 97% water, with methanol concentration variations between 1% and 100% being possible and desirable depending on technology, operating conditions, and load. Once fuel mixing apparatus 306 has mixed the source fuel 330 with the diluting fluid in suitable proportion, this fuel mix 24 is then fed into fuel cell 1 anode chamber 11 through a fuel mix conduit 310, where the fuel mix 24 is chemically reacted according to the fuel cell operational principles discussed earlier in order to produce energy (see, e.g., eqs. (1) through (3)), and particularly, in order to produce the current 19 and support a load.

Although it is preferred to obtain the diluting fluid from the waste output of fuel cell 1 so as to maintain a fully closed system, the management of water is an important technical consideration in a DMFC, and the particular water management scheme may vary from one DMFC to the next. Thus, it is to be considered within the scope of this disclosure and its associated claims that diluting fluid conduit 308 may also provide some or all of the diluting fluid from a source other than the fuel cell 1 waste (i.e., from a source external to the fuel cell system), as is illustrated by the dotted line section of diluting fluid conduit 308 shown toward the bottom of FIG. 3. Conversely, waste water 18 in excess of what is needed for proper dilution of the source fuel 330, e.g., methanol, may need to be removed from the system.

However, to ensure an optimal use of the source fuel 330, it is important to make certain that fuel mixing apparatus 306 in fact mixes the source fuel 330 with the diluting fluid in the desired mixing proportion, which, for a DMFC, is about 3% methanol and 97% water subject to the variations noted earlier. This is required because it is not generally possible to simply pre-mix the source fuel 330 with the diluting fluid in predetermined proportions, because, for example, methanol may be consumed faster under certain external conditions, i.e. temporary heavy loads, temperature variations, etc., and to meet the power demand, it becomes necessary to increase the methanol concentration. In short, this mixing needs to take place dynamically during fuel cell operation. Thus, it becomes important to measure the actual relative proportions of the source fuel 330 and diluting fluid in the fuel mix, and to use this measurement to control the operation of fuel mixing apparatus 306 to maintain this mix at a suitable desired level and adjust the mix as needed to the desired level. A particularly straightforward, low cost, and non-intrusive way to measure these relative proportions of the source fuel 330 and diluting fluid in the fuel mix 24 is to measure the dielectric constant of the fuel mix 24 flowing through fuel mix conduit 310.

In particular, it is to be noted that the dielectric constant of pure methanol is 32.7 (approximately 33), while that of water is approximately 80. Thus, the dielectric constant, $DC_{MIX}$, of a fuel mix 24 comprising a given proportion of methanol, $0 \leq ME \leq 1$, and a given proportion of water, $0 \leq H_2O \leq 1$, will be given by:

$$DC_{MIX} = (ME \times 33) + (H_2O \times 80). \quad (1)$$

Conversely, assuming that the fuel mix 24 comprises only methanol and water, and nothing else (note that there may be other additives or other fuels in the fuel mix 24 as well), i.e., that $ME + H_2O = 1$, thus $H_2O = 1 - ME$, eq. (1) is easily re-expressed in terms of an unknown ME and known $DC_{MIX}$ by:

$$ME = (80 - DC_{MIX})/47 \quad (2)$$

Thus, a fuel mix dielectric constant sensor 312 used to measure the fuel mix dielectric constant $DC_{MIX}$ of the fuel mix 24 flowing through fuel mix conduit 310 can be used to measure the dielectric constant of the fuel mix, and thereby determine the relative proportions of source fuel 330 and diluting fluid generally, and for a DMFC, the relative concentrations of methanol and water. If it is desired, for example, to maintain a 3% methanol fuel mix, it is easily deduced from eq. (1) the desired dielectric constant for the fuel mix, $DC_{MIX}$, is approximately 78.6. A higher dielectric constant would indicate that there is too much water in the fuel mix, while a lower dielectric constant would indicate that there is too much methanol.

Generally, for a fuel cell that consumes a source fuel S of dielectric constant $DC_S$ to be mixed with a diluting fluid D of dielectric constant $DC_D$, eq. (1) is generalized to:

$$DC_{MIX} = (S \times DC_S) + (D \times DC_D). \quad (3)$$

Eq. (2) is therefore generalized, using S+D=1 to:

$$S = (DC_D - DC_{MIX})/(DC_D - DC_S) \quad (4)$$

Thus, fuel mix dielectric constant sensor 312, which, for example, not limitation, comprises a discrete dielectric constant sensor placed directly upon fuel mix conduit 310, or which draws some fuel mix 24 out of fuel mix conduit 310 for separate dielectric constant measurement, is used to determine the dielectric constant of the fuel mix 24 flowing through fuel mix conduit 310 to fuel cell 1. It is assumed that someone of ordinary skill in the art can in fact apply any of a number of known devices and methods for measuring dielectric constants generally, to the specific application of measuring the dielectric constant of the fuel mix 24 flowing through fuel mix conduit 310. The use of any and all such known dielectric constant measurement devices and methods, as applied to the specific task of measuring the dielectric constant of the fuel mix 24 flowing through fuel mix conduit 310, is fully considered to be within the scope of this disclosure and its associated claims.

The dielectric constant $DC_{MIX}$ (or, the source fuel proportion S) determined from fuel mix dielectric constant sensor 312 is then communicated 316 to a fuel mix control and logic module 314. This fuel mix control and logic module 314 uses the measurement from fuel mix dielectric constant sensor 312 to determine whether the fuel mix 24 is suitable (in the desired mixing proportion), or whether it is too rich (too much source fuel, e.g., methanol) or too dilute (too much diluting fluid, e.g., water).

Optionally, fuel mix control and logic module 314 may also cause the measured (actual) fuel mix 24 to be indicated in a form accessible to a human, such as, but not limited to, a visual display or an audible indication. Based on the measured fuel mix, fuel mix control and logic module 314 in turn controls 318 fuel mixing apparatus 306 such that the proportions of source fuel 330 and diluting fluid generally are adjusted to achieve the desired mixing proportion.

It is to be noted that the feedback loop involving the measurement of the fuel mix 24 and the subsequent mixing of the fuel mix 24 can be continuous, i.e., can involve a constant measurement and readjustment of the fuel mix, or it can be discrete, wherein the fuel mix 24 is measured and adjusted at suitable intervals. It is also noted that the use of dashed lines to connect the key components shown in FIG. 3 illustrates information and/or control signals, as opposed to the solid flow line (or dotted, see the optional external diluting fluid conduit 308) connections which indicate fluid flow.

It is also desirable to measure a level 332 of source fuel 330 within fuel tank 302, so that it can be known when additional source fuel 330 needs to be added, and so that this source fuel 330 can in fact be added. For a battery such as earlier discussed in reference to U.S. Pat. No. 4,438,182, the overall level of the reactants remains unaltered but the chemical composition of these reactants changes as current is generated. Thus, there is no problem resulting from changing the physical orientation of the battery, as it is not necessary to measure the level of anything, but only the relative mix between the ic electrolyte and its waste products, i.e., a relative mix between fluidic chemicals maintained at a constant overall total fluidic level. However, in a partially-empty liquid fuel tank, changing the orientation (or changing the motion, e.g., by acceleration or vibration) is a problem, since most methods of measuring a fuel level 332 depend on a constant orientation of the fuel tank. Thus, for example, if one envisions an automobile fuel tank measured by a physical level float, it is clear that the inversion or tilting of the tank would cause the float position and hence the fuel reading to be altered, as can be noted, for example, by the slight change in a fuel gauge that can be observed when a car is driven up or down a steep hill or is rapidly accelerated or decelerated.

In a DMFC, fuel tank 302 will contain some source fuel 330 and some air, depending on how much source fuel 330 is in the tank. When fuel tank 302 is full, it will contain all source fuel 330, and as the source fuel 330 is consumed, space vacated by the consumed source fuel 330 will become filled with air or whatever gas in is the environment surrounding and allowed to enter fuel tank 302. Of course, when empty, fuel tank 302 will contain all air or similar environmental gas.

To measure this fuel level 332 in an orientation-independent manner, a fuel tank dielectric constant sensor 320 is placed on the outside of fuel tank 302, to measure the fuel tank dielectric constant of the entire fuel tank 302, as a total entity. It is important to note that the dielectric constant of the entire tank is being measured, since the measurement results obtained from probing only specific regions of the tank rather than from the total tank would be dependent upon tank orientation, whereas a total tank measurement is orientation independent. Thus, fuel tank dielectric constant sensor 320 needs to comprise a large area capacitor or multiple dielectric sensors (a plurality of dielectric sensors) to measure the capacitance of the entire fuel tank, irrespective of orientation.

The process for carrying out this measurement is based generally on eqs. (3) and (4). In this instance, however, the dielectric constant being measured involves the mix of source fuel 330, e.g., methanol, and the environmental gas, e.g., air. The total tank dielectric constant, $DC_{TANK}$ is given in terms of the source fuel 330 proportion S, the dielectric constant of the source fuel $DC_S$, the environmental gas proportion G, and the dielectric constant of the environmental gas $DC_G$, according to:

$$DC_{TANK}=(S \times DC_G)+(G \times DC_G) \quad (5)$$

while the inverse of eq. 5, using S+G=1, is:

$$S=(DC_G-DC_{TANK})/(DC_G-DC_S). \quad (6)$$

For a source fuel 330 of methanol ME, with an approximate dielectric constant of $DC_S=33$, and for an environmental gas G air which has a dielectric constant $DC_G=1$, these specialize or a DMFC tank in air, to:

$$DC_{TANK}=(ME \times 33)+(G \times 1), \quad (7)$$

and, with ME+G=1, to:

$$ME=(DC_{TANK}-1)/32. \quad (8)$$

Thus, by taking a total tank measurement of the dielectric constant $DC_{TANK}$ of fuel tank 302 using fuel tank dielectric constant sensor 320, it is easily deduced from eqs. (6) and/or (8) how much fuel remains in fuel tank 302 at any given time. And, because fuel tank dielectric constant sensor 320 comprises a large area capacitor or multiple dielectric sensors to measure the capacitance of the entire fuel tank, this measurement of the fuel level is independent of the orientation of fuel tank 302. Similarly to the fuel mix monitoring earlier disclosed, the fuel tank 302 fuel level can be monitored continuously, or discretely at suitable times.

Once the measurement according to eq. (6) generally or eq. (8) for a DMFC is obtained, this measurement is communicated 322 to a fuel tank indicator and control module 324. In one embodiment, fuel tank control and logic module 324 simply indicates in a form accessible to a human, such as a visual display or an audible indication, how much fuel remains. Of course, the measurement of the fuel tank dielectric constant provides a basis for adding additional source fuel 330 to fuel tank 302, either manually or automatically. In an automatic fuel replenishment embodiment, the overall fuel cell system comprises a source fuel reservoir 326 containing extra source fuel which refills 328 fuel tank 302 whenever source fuel reservoir 326 receives a low fuel level signal 336 from fuel tank control and logic module 324 indicating that the source fuel level in fuel tank 302 has dropped below a desired source fuel level.

In another embodiment, for devices such as telephones, computers, personal digital assistants, and similar devices that have a telecommunications link 334 such as a telephone or internet connection, fuel tank control and logic module 324, once it has detected that the source fuel 330 had dropped below a desired level, automatically orders a source fuel 330 refill over telecommunications link 334. For using fuel cell systems to power devices which do not have such a telecommunications link 334 already, such a telecommunications link 334 can be provided with, and as part of, the overall fuel cell system.

More generally, if illustrated element 320 is a fuel tank level sensor generally, and is not restricted to a sensor that takes full-tank dielectric constant measurements, then yet another embodiment uses a measurement of how much source fuel remains in the fuel tank 302—however this measurement is made—to automatically order a source fuel 330 refill over telecommunications link 334.

Finally, it is to be observed that although fuel mix control and logic module 314 and fuel tank control and logic module 324 are illustrated as separate components in FIG. 3, that each of these control modules can be incorporated into a single dielectric constant measurement control and logic module 4, as schematically illustrated in FIG. 4. This is because each of fuel mix control and logic module 314 and fuel tank control and logic module 324 preferably comprise a computerized device which accepts dielectric constant measurements from a dielectric constant sensor (either fuel mix dielectric constant sensor 312 or fuel tank dielectric constant sensor 320), and which, based on this measurement, causes some action to be taken (controlling the fuel mix 24 in 310 or refilling the fuel tank 302) and/or makes certain information to be made available (what the current fuel mix 24 is or how much source fuel 330 remains in the fuel tank).

It is to be observed, of course, that FIGS. 3 and 4 are schematic drawings illustrating applicant's disclosure, and are not in any way intended to specify the physical, geometric locations, orientations, and interrelationships between the various components discussed in these figures, Any physical embodiment that implements the functions schematically disclosed in FIGS. 3 and 4 is of course to be considered within the scope of this disclosure and its associated claims.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. A fuel cell system, comprising:
   a fuel cell mixing apparatus into which can be fed a source fuel and a diluting fluid, capable of mixing said source fuel and said diluting fluid together in a desired mixing proportion into a fuel mix, and capable of outputting said fuel mix for feeding to a fuel cell; and
   a fuel mix dielectric constant sensor capable of measuring a fuel mix dielectric constant of said fuel mix output from said fuel cell mixing apparatus, thereby enabling actual relative proportions of said source fuel and said diluting fluid within said fuel mix to be determined from said fuel mix dielectric constant; wherein:
   the measurement of said fuel mix dielectric constant is used in a feedback loop as a basis to adjust, as needed, said mixing said source fuel and said diluting fluid together, in order to maintain said desired mixing proportion.

2. The system of claim 1, further comprising said fuel cell, wherein said fuel mix is fed to said fuel cell.

3. The system of claim 1, said fuel cell system comprising a direct methanol fuel cell system, said source fuel comprising methanol, and said diluting fluid comprising water.

4. The system of claim 3, wherein said methanol and water are mixed into said fuel mix such that said desired mixing proportion of said methanol within said fuel mix is determined based upon particular technologies used for said fuel call and said fuel cell system.

5. The system of claim 3, wherein said methanol and water are mixed into said fuel mix such that said desired mixing proportion of said methanol within said fuel mix is within a range comprising:
   a lower range boundary selected from the lower range boundary group consisting of: 2%, and 1% of said fuel mix; and
   an upper range boundary selected from the upper range boundary group consisting of: 5%, 10%, 15%, 30%, 50%, 75%, 90%, and 100% of said fuel mix.

6. The system of claim 3, wherein said desired mixing proportion of said methanol within said fuel mix is approximately 3% of said fuel mix.

7. The system of claim 1, said diluting fluid comprising waste output from said fuel cell.

8. The system of claim 3, said diluting fluid comprising waste water output from said fuel cell.

9. The system of claim 1, further comprising a fuel mix indicator module capable of indicating said actual relative proportions of said source fuel and said diluting fluid within said fuel mix based on said measurement of said fuel mix dielectric constant, in a form accessible to a human.

10. The system of claim 1, further comprising:
    a fuel tank dielectric constant sensor capable of measuring a fuel tank dielectric constant of an entire fuel tank of said fuel cell system, thereby enabling relative proportions of a source fuel and an environmental gas within said fuel tank to be determined from said fuel tank dielectric constant irrespective of an orientation and a motion of said fuel tank.

11. The system of claim 10, further comprising:
    a fuel tank indicator module capable of indicating how much of said source fuel remains in said fuel tank based on said measurement of said fuel tank dielectric constant, in a form accessible to a human.

12. The system of claim 10, further comprising a dielectric constant measurement control and logic module accepting dielectric constant measurements from both said fuel mix dielectric constant sensor and said fuel tank dielectric constant sensor, and, based on said dielectric constant measurements, causing said mixing said source fuel and said diluting fluid together to be adjusted, and causing the indication of how much of said source fuel remains in said fuel tank to be made.

13. A fuel cell system, comprising:
    a fuel tank dielectric constant sensor capable of measuring a fuel tank dielectric constant of an entire fuel tank of said fuel cell system, thereby enabling relative proportions of a source fuel and an environmental gas within said fuel tank to be determined from said fuel tank dielectric constant irrespective of an orientation and a motion of said fuel tank.

14. The system of claim 13, further comprising:
    a fuel tank indicator module capable of indicating how much of said source fuel remains in said fuel tank based on said measurement of said fuel tank dielectric constant, in a form accessible to a human.

15. The system of claim 13, said fuel tank dielectric constant sensor comprising a large area capacitor measuring a capacitance of said entire fuel tank to measure said fuel mix dielectric constant.

16. The system of claim 13, said fuel tank dielectric constant sensor comprising a plurality of dielectric sensors measuring a capacitance of said entire fuel tank to measure said fuel mix dielectric constant.

17. The system of claim 13, wherein:
    the measurement of said fuel tank dielectric constant is used as a basis for adding additional source fuel to said fuel tank.

18. The system of claim 17, further comprising:
    a source fuel reservoir automatically adding said additional source fuel to said fuel tank in response to said measurement of said fuel tank dielectric constant.

19. The system of claim 13, further comprising:
    a telecommunications link, wherein:
    a source fuel refill is automatically ordered over said telecommunications link in response to said measurement of said fuel tank dielectric constant.

20. A fuel cell system, wherein said fuel cell system is powered by a direct oxidation fuel cell, comprising:
    a telecommunications link of said fuel cell system powered by said direct oxidation fuel cell, for automatically ordering a refill of a source fuel for said fuel cell system, in response to a measurement of how much of said source fuel remains in a fuel tank of said fuel cell system; wherein:
    said ordering comprises ordering from a supplier of source fuel replacements.

21. A method for maintaining a desired mixing proportion of a fuel mix comprising a source fuel and a diluting fluid, capable of being fed to a fuel cell of a fuel cell system, comprising the steps of:
    measuring a fuel mix dielectric constant of said fuel mix, thereby enabling actual relative proportions of said source fuel and said diluting fluid within said fuel mix to be determined from said fuel mix dielectric constant; and using the measurement of said fuel mix dielectric constant in a feedback loop as a basis to adjust, as needed, a mixing of said source fuel and said diluting fluid together, in order to maintain said desired mixing proportion.

22. The method of claim 21, further comprising the step of feeding said fuel mix to said fuel cell.

23. The method of claim 21, said fuel cell system comprising a direct methanol fuel cell system, said source fuel comprising methanol, and said diluting fluid comprising water.

24. The method of claim 23, further comprising the step of mixing said methanol and water into said fuel mix wherein said desired mixing proportion of said methanol within said fuel mix is determined based upon particular technologies used for said fuel call and said fuel cell system.

25. The method of claim 23, further comprising the step of mixing said methanol and water into said fuel mix wherein said desired mixing proportion of said methanol within said fuel mix is within a range comprising:

a lower range boundary selected from the lower range boundary group consisting of: 2%, and 1% of said fuel mix; and an upper range boundary selected from the upper range boundary group consisting of: 5%, 10%, 15%, 30%, 50%, 75%, 90%, and 100% of said fuel mix.

26. The method of claim 23, further comprising the step of mixing said methanol into said fuel mix in said desired mixing proportion of approximately 3% of said fuel mix.

27. The method of claim 21, further comprising the step of:

supplying at least some of said diluting fluid from waste output from said fuel cell.

28. The method of claim 23, said diluting fluid comprising waste water output from said fuel cell.

29. The method of claim 21, further comprising the step of:

indicating the actual relative proportions of said source fuel and said diluting fluid within said fuel mix based on said measurement of said fuel mix dielectric constant, in a form accessible to a human.

30. The method of claim 21, in combination with a method for maintaining a fuel level in a fuel tank of said fuel cell system irrespective of an orientation and a motion of said fuel tank, further comprising the step of:

measuring a fuel tank dielectric constant of the entire said fuel tank, thereby enabling relative proportions of a source fuel and an environmental gas within said fuel tank to be determined from said fuel tank dielectric constant irrespective of said orientation and said motion of said fuel tank.

31. The method of claim 30, further comprising the step of:

indicating how much of said source fuel remains in said fuel tank based on said measurement of said fuel tank dielectric constant, in a form accessible to a human.

32. The method of claim 30, further comprising the steps of:

accepting dielectric constant measurements of both said fuel mix dielectric constant and said fuel tank dielectric constant using a dielectric constant measurement control and logic module; and causing the mixing of said source fuel and said diluting fluid together to be adjusted, and also causing the indication of how much of said source fuel remains in said fuel tank to be made, based on said fuel mix and fuel tank dielectric constant measurements, using said dielectric constant measurement control and logic module.

33. A method for maintaining a fuel level in a fuel tank of a fuel cell system irrespective of an orientation and a motion of said fuel tank, comprising the step of:

measuring a fuel tank dielectric constant of the entire said fuel tank, thereby enabling relative proportions of a source fuel and an environmental gas within said fuel tank to be determined from said fuel tank dielectric constant irrespective of said orientation and said motion of said fuel tank.

34. The method of claim 33, further comprising the step of:

indicating how much of said source fuel remains in said fuel tank based on said measurement of said fuel tank dielectric constant, in a form accessible to a human.

35. The method of claim 33, said step of measuring said fuel mix dielectric constant further comprising the step of measuring a capacitance of said entire fuel tank, using a large area capacitor.

36. The method of claim 33, said step of measuring said fuel mix dielectric constant further comprising the step of measuring a capacitance of said entire fuel tank, using a plurality of dielectric sensors.

37. The method of claim 33, further comprising the step of:

using the measurement of said fuel tank dielectric constant as a basis for adding additional source fuel to said fuel tank.

38. The method of claim 37, further comprising the step of:

automatically adding said additional source fuel to said fuel tank in response to said measurement of said fuel tank dielectric constant.

39. The method of claim 33, further comprising the steps of:

automatically ordering a source fuel refill over a telecommunications link of said fuel cell system, in response to said measurement of said fuel tank dielectric constant, constant.

40. A method for maintaining a fuel level in a fuel tank of a fuel cell system, comprising the steps of:

powering said fuel cell system with a direct oxidation fuel cell; and automatically ordering a refill of a source fuel for said fuel cell system over a telecommunications link of said fuel cell system powered by said direct oxidation fuel cell, in response to a measurement of how much of said source fuel remains in said fuel tank; wherein:

said ordering comprises ordering from a supplier of source fuel replacements.

41. The system of claim 1, wherein said source fuel and diluting fluid are mixed into said fuel mix such that said desired mixing proportion of said source fuel within said fuel mix is within a range comprising:

a lower range boundary selected from the lower range boundary group consisting of: 2%, and 1% of said fuel mix; and an upper range boundary selected from the upper range boundary group consisting of: 5%, 10%, 15%, 30%, 50%, 75%, 90%, and 100% of said fuel mix.

42. The method of claim 21, further comprising the step of mixing said source fuel and diluting fluid into said fuel mix wherein said desired mixing proportion of said source fuel within said fuel mix is within a range comprising:

a lower range boundary selected from the lower range boundary group consisting of: 2%, and 1% of said fuel mix; and an upper range boundary selected from the upper range boundary group consisting of: 5%, 10%, 15%, 30%, 50%, 75%, 90%, and 100% of said fuel mix.

43. The fuel cell system of claim 20, said fuel cell system further comprising an electronic device thereof, wherein:

said electronic device is powered by said direct oxidation fuel cell; and said electronic device comprises said telecommunications link of said fuel cell system powered by said direct oxidation fuel cell.

44. The method of claim 40, said fuel cell system further comprising an electronic device thereof, and said electronic device comprising said telecommunications link of said fuel cell system powered by said direct oxidation fuel cell, further comprising the steps of:

powering said electronic device with said direct oxidation fuel cell; and ordering said refill of said source fuel over said telecommunications link of said electronic device.

* * * * *